United States Patent
Lee et al.

(10) Patent No.: US 8,326,658 B1
(45) Date of Patent: Dec. 4, 2012

(54) GENERATION AND CONTEXTUAL PRESENTATION OF STATISTICAL DATA REFLECTIVE OF USER SELECTIONS FROM AN ELECTRONIC CATALOG

(75) Inventors: Dennis Lee, Mercer Island, WA (US); Randal Henne, Seattle, WA (US); Jeffrey Holden, Seattle, WA (US); David Hsu, Seattle, WA (US); Brent Smith, Redmond, WA (US); Eric Vadon, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 2683 days.

(21) Appl. No.: 10/864,288

(22) Filed: Jun. 9, 2004

Related U.S. Application Data (60) Provisional application No. 60/561,776, filed on Apr. 12, 2004.

(51) Int. Cl.
G06Q 10/00 (2006.01)

(52) U.S. Cl. .................................................. 705/7.11

(58) Field of Classification Search .............. 705/10, 705/26, 37, 7.11, 26.1; 707/3
See application file for complete search history.

(56) References Cited

U.S. PATENT DOCUMENTS

| | | | |
|---|---|---|---|
| 4,346,718 A | | 8/1982 | Morris |
| 5,909,023 A * | | 6/1999 | Ono et al. ............. 235/380 |
| 6,438,579 B1 | | 8/2002 | Hosken |
| 6,460,036 B1 | | 10/2002 | Herz |
| 6,484,149 B1 * | | 11/2002 | Jammes et al. ........ 705/26.62 |
| 6,505,185 B1 | | 1/2003 | Chickering |
| 6,691,163 B1 | | 2/2004 | Tufts |
| 6,782,370 B1 | | 8/2004 | Stack |
| 6,839,680 B1 * | | 1/2005 | Liu et al. ................ 705/10 |
| 6,871,186 B1 | | 3/2005 | Tuzhilin et al. |
| 6,947,922 B1 * | | 9/2005 | Glance .................... 707/3 |
| 6,963,850 B1 * | | 11/2005 | Bezos et al. ............ 705/26 |
| 7,062,510 B1 | | 6/2006 | Eldering |
| 7,092,936 B1 * | | 8/2006 | Alonso et al. ............ 707/3 |
| 7,159,023 B2 * | | 1/2007 | Tufts ....................... 709/224 |
| 7,165,041 B1 * | | 1/2007 | Guheen et al. .......... 705/26 |
| 2001/0047307 A1 * | | 11/2001 | Bennett et al. ......... 705/26 |
| 2002/0019763 A1 * | | 2/2002 | Linden et al. ........... 705/10 |
| 2002/0120554 A1 * | | 8/2002 | Vega ....................... 705/37 |

(Continued)

OTHER PUBLICATIONS

Fortune The website is the business, New York 2001. vol. 142, Iss 12; p. 144, 5 PGS.*

(Continued)

*Primary Examiner* — Lynda Jasmin
*Assistant Examiner* — Luis Santiago
(74) *Attorney, Agent, or Firm* — Knobbe, Martens, Olson & Bear LLP (57) ABSTRACT

An electronic catalog system monitors browsing actions of users to generate user activity data. A data mining component analyzes the user activity data to generate conditional probability data that is presented to users contextually to assist users in selecting items from the electronic catalog. The conditional probability data reflects the frequencies with which users that have performed specific actions, such as viewing a particular item, set of items or web page, or conducting a specific search, have thereafter acquired specific items from the catalog. For example, in one embodiment, when a user selects a first item for viewing in the catalog, the user is notified, for at least one second item, of a frequency with which users who have viewed the first item and then made a purchase have acquired the second item.

14 Claims, 4 Drawing Sheets

U.S. PATENT DOCUMENTS

2002/0198882 A1    12/2002    Linden et al.
2003/0177070 A1    9/2003    Viswanath et al.
2005/0038717 A1*    2/2005    McQueen et al. .............. 705/27

OTHER PUBLICATIONS

E-Commerce Recommendation Applications, J. Ben Schafer, Joseph A. Konstan, John Riedl. Data Mining and Knowledge Discovery. Boston: Jan. 2001. vol. 5, Iss. 1-2; p. 115.*

J. Ben Schafer, Joseph A. Konstan, John Riedl; E-Commerce Recommendation Applications; Data Mining and Knowledge Discovery; Boston: Jan. 2001. vol. 5, Iss. 1-2; p. 115-153.*

Zaiane, et al., "Discovering Web Access Patterns and Trends by Applying OLAP and Data Mining Technology on Web logs," Proceedings of IEEE International Forum on Research and Technology Advances in Digital Libraries, pp. 19-29, Apr. 22-24, 1998.

R. Agrawal et al, "Quest: a project on database mining," Proceedings of the 1994 ACM SIGMOD International Conference on Management of Data, 1994, p. 514 (ISSN: 0163-5808).

R. Agrawal et al, "Mining association rules between sets of items in large databases," Proceedings of the 1993 ACM SIGMOD International Conference on Management of Data, 1993, pp. 207-216.

M. Gery and H. Haddad, "Evaluation of web usage mining approaches for user's next request prediction," Proceedings of the 5th ACM International Conference on Web information and Data Management, pp. 74-81, 2003 (ISBN: 1-58113-725-7).

R. Srikant and R. Agrawal, "Mining Sequential Patterns: Generalizations and Performance Improvements," Proceedings of the 5th International Conference on Extending Database Technology, pp. 3-17, 1996 (ISBN: 3-540-61057-X).

* cited by examiner

FIG. 4

GENERATION AND CONTEXTUAL PRESENTATION OF STATISTICAL DATA REFLECTIVE OF USER SELECTIONS FROM AN ELECTRONIC CATALOG

RELATED APPLICATIONS

This application claims the benefit of U.S. Provisional Application No. 60/561,776, filed Apr. 12, 2004.

FIELD OF THE INVENTION

The present invention relates to data mining algorithms for analyzing browse histories of users of an electronic catalog.

BACKGROUND OF THE INVENTION

A variety of technologies exist for collecting and mining user activity data reflective of the actions and preferences of users of an electronic catalog. For example, it is known in the art to collectively analyze the activity data of a population of users to identify items that tend to be viewed, purchased, or otherwise selected in combination. Different types of item relationships may be detected by applying different similarity metrics to the activity data. For instance, a pair of items, A and B, may be identified as likely substitutes because a relatively large number of the users who viewed A also viewed B during the same browsing session. Items C and D, on the other hand, may be identified as complementary because a relatively large number of those who purchased C also purchased D.

The item relationships detected through this process may be exposed to users of the electronic catalog to assist users in identifying items of interest. For example, in some systems, when a user views a catalog item, the user is informed of other items that are commonly viewed (or purchased) by those who have viewed (or purchased) this item. Although this type of data assists the user in identifying a set of candidate items from which to make a selection (e.g., a set of consumer electronics products with similar features), it generally does not help the user discriminate between these candidate items. Thus, the user typically must rely solely on the descriptions of the candidate items, including any user ratings and reviews, in making a purchase decision.

SUMMARY OF THE INVENTION

The present invention comprises data mining methods for analyzing user activity data associated with an electronic catalog of items to generate data for assisting users in making informed item selection decisions. The invention may be embodied within any type of electronic catalog system (web site, online services network, multi-site "mall" system, etc.) in which users can select catalog items to purchase, rent, download, or otherwise acquire.

In one embodiment, a data mining component analyzes the user activity data of a population of users, as collected over a period of time, to generate conditional probability values for specific pairs of items in the electronic catalog. Each conditional probability value preferably indicates, for a given item pair (item A, item B), what percentage of the users who browsed item A and thereafter acquired an item acquired item B. For example, in the context of purchases, the conditional probability value may indicate what percentage of the users who made a purchase after viewing item A purchased item B. Certain types of purchases, such as purchases of items outside the item category of item A and/or purchases made beyond a selected time interval after viewing item A, may be disregarded for purposes of this calculation.

The conditional probability values may be displayed in the catalog in association with specific items to assist users in making informed item selection decisions. For instance, in one embodiment, when a user accesses an item detail page, the user is presented with a list of the following general form: "users who purchased an item after viewing this item bought the following: 4% bought item A, 2% bought this item, and 1.5% bought item B." Thus, in addition to being informed of other items that are similar or related to the item selected for viewing, the user is provided with data that assists the user in selecting between the various related items. This data allows the user to very efficiently rely on the research conducted, and the ultimate purchase decisions made, by prior users who considered this particular item.

In another embodiment, the user activity data is analyzed to generate conditional probability data for specific sets of items that may be viewed during the course of a browsing session (e.g., the set consisting of items A and B). Once a user views all of the items in such a set, the associated conditional probability data may be presented to the user. For example, if a user selects both item A and item B for viewing during a browsing session, the user may be notified that "users who made a purchase after viewing item A and item B bought the following: 5% bought item B, 2% bought item C, and 1% bought item A."

Condition probability data may also be generated and presented in other contexts. For example, in one embodiment, a browse node page corresponding to a category of products is augmented with a notification that "user's who made a purchase after accessing this page bought the following items . . . ," together with associated percentage values. In another embodiment, a user who conducts a search for <search query> is notified that "users who made a purchase after searching for <search query> purchased the following items . . . ," together with associated percentage values.

Thus, one aspect of the invention is a data mining method that comprises programmatically analyzing user activity data to identify a set of users that acquired an item from an electronic catalog after performing a defined set of one or more browsing actions. The defined set of browsing actions may, for example, be the viewing of a particular item or set of items, the viewing of a particular web page, or the submission of a particular search query. The method further comprises calculating, for at least a first item in the electronic catalog, a percentage of the set of users that acquired the first item after performing the defined set of browsing actions. When a user performs the defined set of browsing actions, the user is notified of said percentage of users that selected the first item.

Neither this summary nor the following detailed description purports to define the invention. The invention is defined by the claims.

DETAILED DESCRIPTION OF PREFERRED EMBODIMENTS

Specific embodiments of the invention will now be described with reference to the drawings. These embodiments are intended to illustrate, and not limit, the present invention. For example, although the specific embodiments described herein involve the generation and display of data regarding item purchase events, the invention is also applicable to other types of item acquisition actions, including rentals, licenses and downloads of items.

Figure 1:
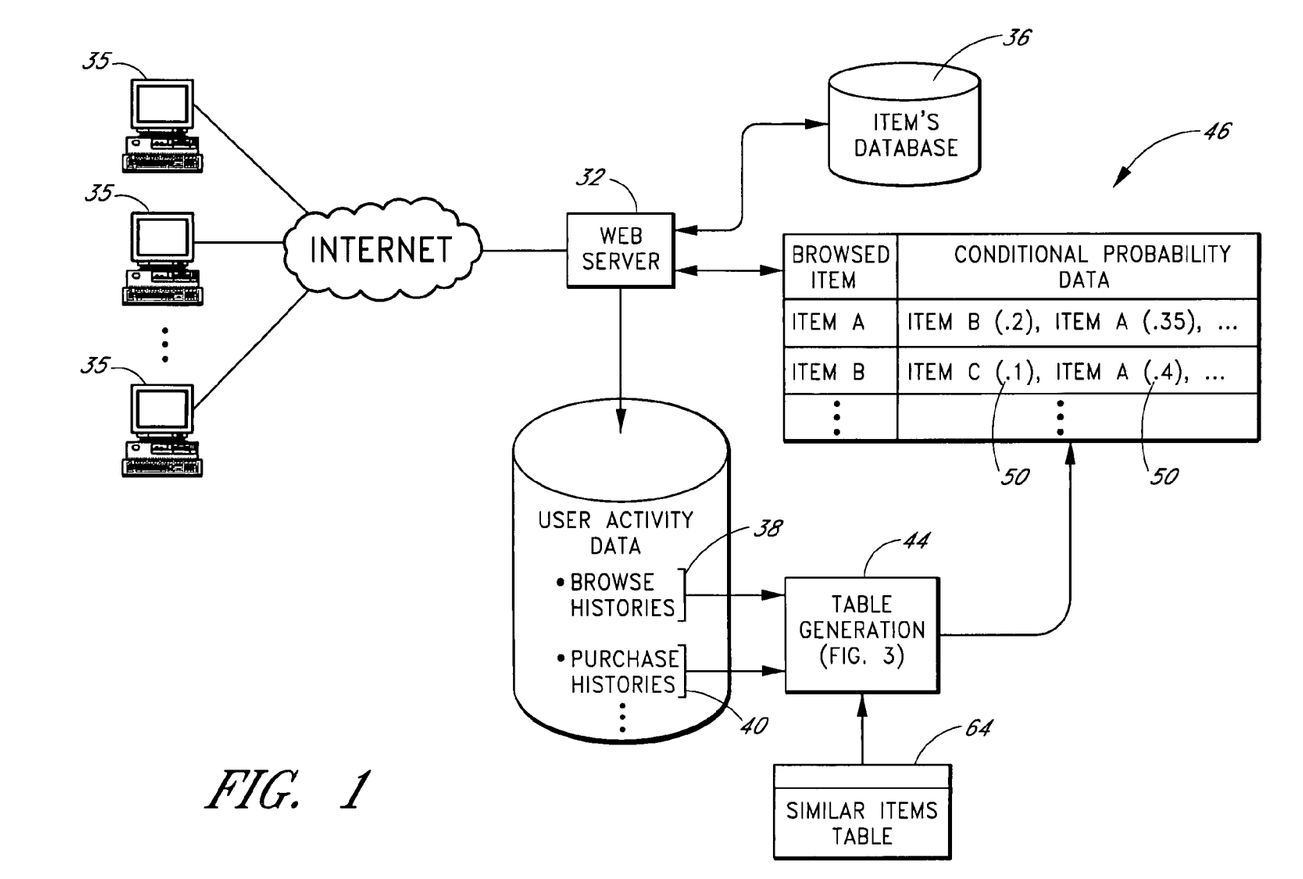
FIG. 1 illustrates a web site system according to one embodiment of the invention.

FIG. 1 illustrates a web site system 30 according to one embodiment of the invention. The web site system 30 includes a web server 32 that generates and serves pages of a host web site to computing devices 35 of end users. The web server 32 provides user access to a catalog of items represented within a database 36. The items preferably include or consist of items that may be purchased via the web site (e.g., consumer electronics products; household appliances; book, music and video titles in physical or downloadable form; magazine and other subscriptions, etc.), and may be arranged within a hierarchy of browse categories. Many thousands or millions of different items may be represented in the database 36. The web site system 30 may, for example, include all of the components and features described in U.S. Patent Pub. No. US 2002/0019763 A1, published Feb. 14, 2002 ("the '763 publication"), the disclosure of which is hereby incorporated by reference.

Detailed information about each item may be obtained by users by accessing the item's detail page within the catalog, which may be located, for example, by conducting a search for the item or by selecting the item from a browse tree listing. Each item detail page preferably provides an option for the user to purchase the item. The web server 32 preferably generates the item detail pages, and other pages of the web site, dynamically using web page templates (not shown).

As illustrated in FIG. 1, the web site system 30 maintains time-stamped item browse histories 38 and item purchase histories 40 of users of the system. The item browse history 38 of a user identifies the items selected by that user for viewing, and indicates the date and time of each such item browse event. In the preferred embodiment, each user access to an item detail page is treated as an item viewing or browsing event. Typically, each access to an item detail page occurs as the result of an affirmative selection of the corresponding item for viewing (e.g., from a search results page or a browse node page). The purchase history 40 of each user identifies all of the items purchased by that user, together with the associated dates of purchase. The item browse and purchase histories 38, 40 of the users may be maintained in any suitable format (web log, user database, event history database, etc.), and may but need not be stored separately from each other and from other types of user activity data.

In some embodiments, the browse and/or purchase histories 38, 40 may include or consist of data obtained from external sources. For example, user activity data may additionally be acquired from third party web site operators, and/or from browser toolbars that report users' browsing activities.

As further illustrated in FIG. 1, a table generation process 44 periodically and collectively analyzes or "mines" the item browse and purchase histories of the users to generate a browse-purchase mapping table 46. Each entry (depicted as a row) of this table 46 maps a reference catalog item to a listing of the catalog items that have been purchased the most frequently, within a selected time period (e.g., one day or one week), by users who have viewed the reference catalog item. A separate table entry may be included for each item in the catalog for which the collected browse and purchase activity data is sufficient to generate meaningful data. As depicted by the example table data in FIG. 1, the list of purchased items for a given reference item may include the reference item itself. The table generation process 44 may be in the form of a program that runs on a general purpose computer, and may be executed periodically in an off-line processing mode.

Each "purchased item" within a given table entry is stored together with a conditional probability value 50 that indicates or reflects the relative frequency with which users who viewed the reference item thereafter (within a selected time period) bought the purchased item. In a preferred embodiment, the conditional probability value 50 for a given browsed item/purchased item pair is calculated by taking the ratio of (a) the number of users who bought the purchased item within the selected time period after viewing the browsed item, and (b) the total number of users who purchased any item within the selected time period after viewing the browsed item. Certain types of purchases may optionally be disregarded for purposes of this calculation, such as some or all of the following: (a) purchases of items falling outside an item category, such as the top-level browse category, of the browsed item; (b) purchases that occur outside a browsing session in which the browsed item is viewed; (c) purchases that occur only after the relevant user had made one or more intervening purchases after viewing the browsed item. Any of a variety of alternative calculations may be used to generate the conditional probability values.

As depicted in FIG. 1, the web server 32 accesses the browse-purchase mapping table 46 in order to supplement item detail pages of the catalog. Specifically, upon receiving a request for the item detail page for a particular catalog item, the web server 32 retrieves, and incorporates into the detail page, all or a portion of the corresponding listing of purchased items, including the associated conditional probability values. This listing may alternatively be retrieved from a cache, or may be included within the static or semi-static content of the item detail page.

Figure 2:
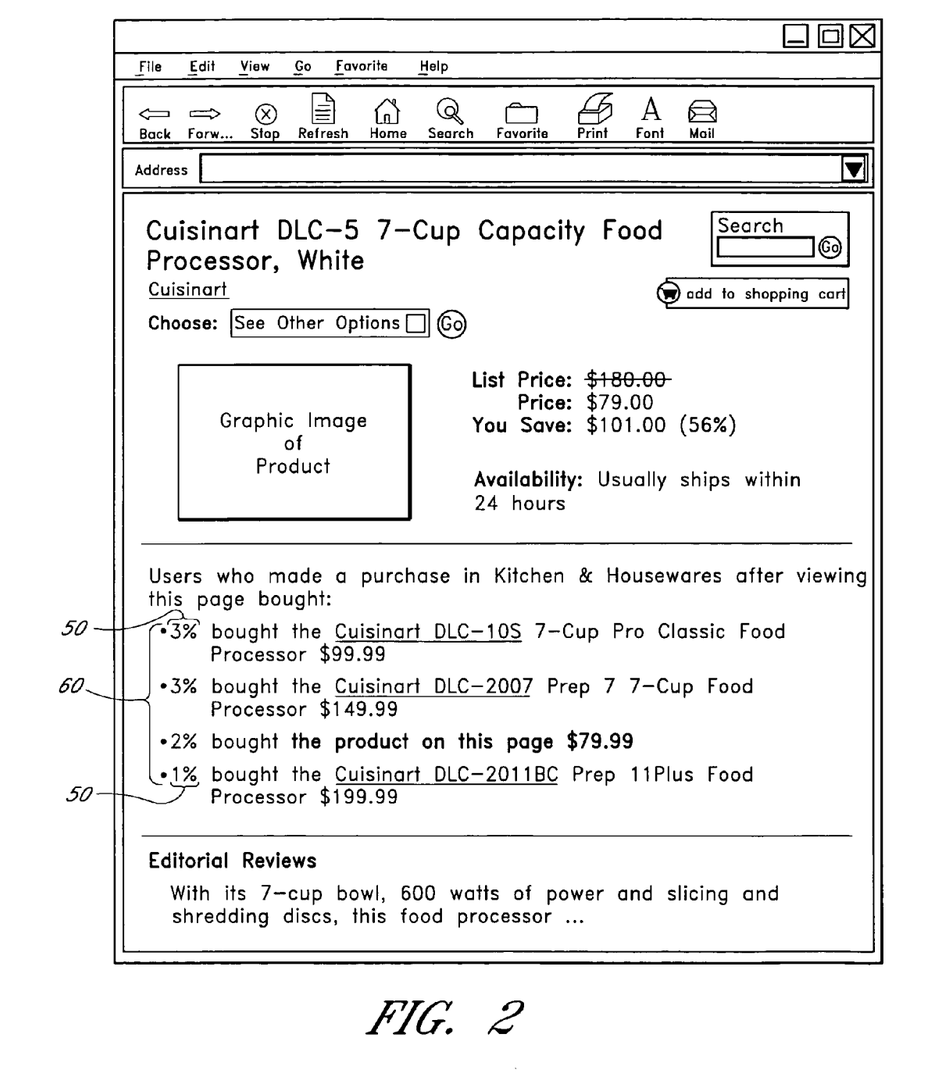
FIG. 2 illustrates a product detail page generated in accordance with one embodiment of the invention.

FIG. 2 illustrates one example of how this data may be presented on an item detail page. In this example, the user is viewing a web page associated with a particular item (product) falling within the "kitchen and housewares" category of the catalog. The page has been supplemented with a list 60 of the four "kitchen and housewares" items that have been purchased the most frequently (within the selected time period) by users who have viewed the item detail page for this product. The associated conditional probability values 50 are displayed as percentage values. The list 60 of items and associated values 50 is referred to herein as a conditional probability list. ("Conditional probability" refers generally to the probability of an event occurring given that another event, or set of events, has occurred.)

In this particular example, the product that is featured on the item detail page is also included (in bold) in the conditional probability list 60. The other products included in the list 60 are preferably products that are similar or related to the product featured on the detail page, such as products that fall within the same bottom-level product/browse category as the featured item. Thus, in addition to informing the user of possible alternatives to the product selected for viewing, the item detail page provides the user with data regarding the ultimate purchase decisions made by others who have viewed the same item. This data allows the user to very efficiently benefit from the product research conducted by prior users who have viewed this particular product.

Although the conditional probability list 60 is displayed on an item detail page in this example, the list 60 may alternatively be presented to the user elsewhere, such as in a pop-up window or in a browser toolbar display area. In addition, although the conditional probability values 50 are displayed numerically in this example, they may alternatively be presented graphically (e.g., within a bar chart or pie chart, via color coding or shading, using icons, etc.).

As will be apparent, conditional probability data of the type shown in FIG. 2 may also be generated, and presented contextually, for other types of pages of the electronic catalog. For example, the browse node (category) page for a given item category may be augmented with a conditional probability list 60 of the following form: "users who made a purchase in this item category after viewing this page bought . . . ." The process for generating such a list 60 is substantially the same as described herein, but incorporates activity data regarding visits to browse node pages in place of data regarding visits to item detail pages.

Figure 3:
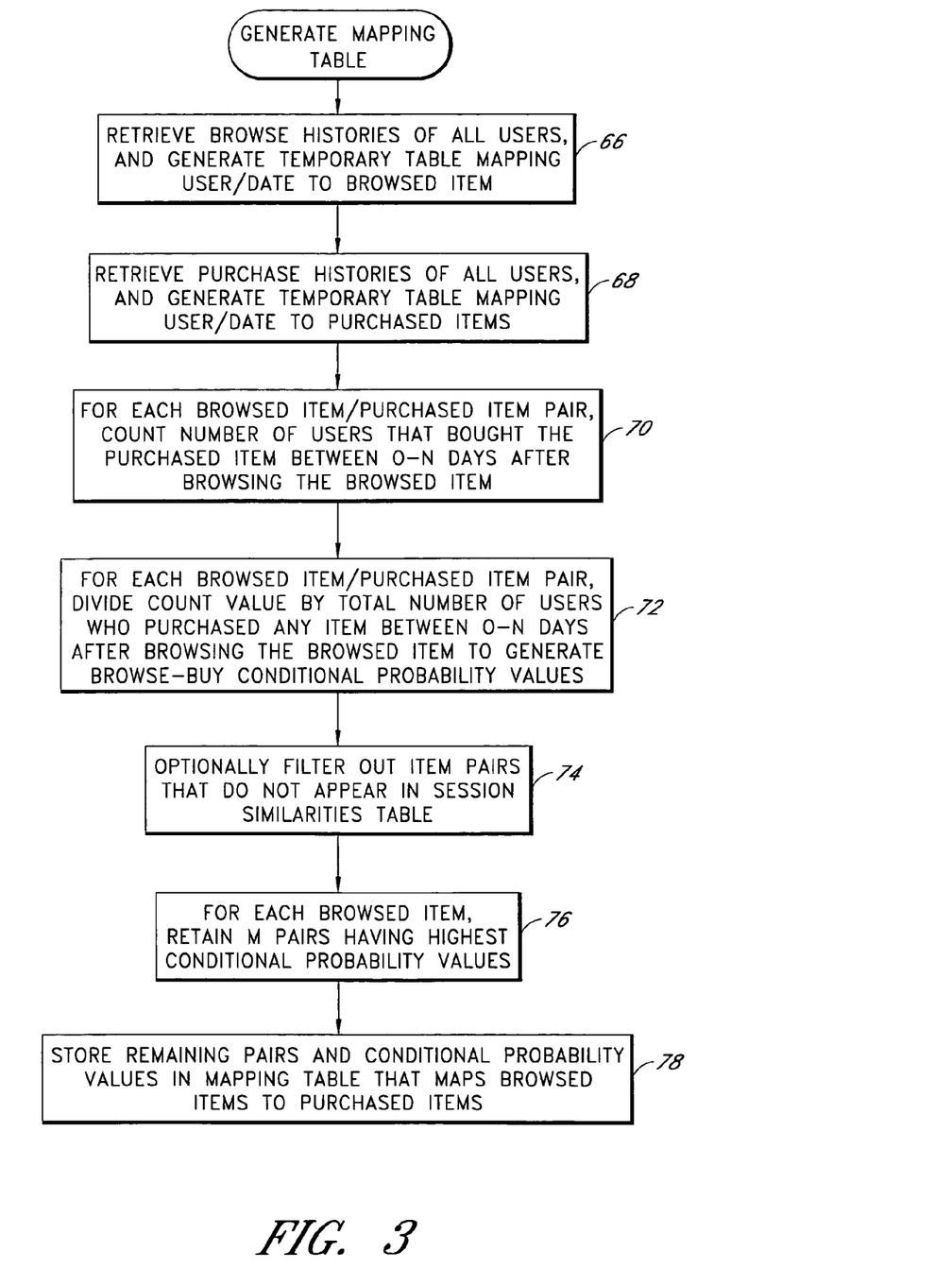
FIG. 3 illustrates one example of a data mining method that may be used to generate a mapping table of the type shown in FIG. 1.

FIG. 3 illustrates an example process (sequence of steps) that may be performed by the table generation process 44 of FIG. 1 to generate the mapping table 46. This process may be repeated periodically (e.g., once a week) to update or regenerate the table 46 so that the table data reflects the most recent set of user activity data. Typically, the table 46 will be generated based on the browse and purchase actions of many thousands or hundreds of thousands of users. For purposes of generating the table and displaying conditional probability data, different versions of a given product or work may be treated as the same item. Examples include hardcover and paperback versions of the same book title, video and DVD versions of the same movie title, CD and tape versions of the same music title, and different releases or editions of a particular product.

In step 66, the browse histories of all users of the system are retrieved, and are used to build a temporary table that maps user/date information to browsed items. This table indicates, for each user and each date, what items were viewed by that user on that date. In a preferred embodiment in which each item has a corresponding detail page in the catalog, a user is treated as having viewed or browsed an item if and only if the user accessed the item's detail page. The invention does not, however, require the use or existence of item detail pages.

In step 68, the purchase histories of all users are retrieved, and are similarly used to generate a temporary table that maps user/date information to purchased items. As mentioned above, histories of other types of acquisition events (item downloads, rental selections, etc.) may additionally or alternatively be used to build this table. The two temporary tables may, but need not, be limited to a particular date range (e.g., the last three months).

In step 70, the temporary tables are used to count, for each browsed item/purchased item pair, how many users bought the purchased item within 0-N days after viewing the browsed item. (To simplify the analysis, a purchase of the purchased item is preferably assumed to have occurred after the viewing of the browsed item if, both events occurred on the same day.) The value N defines the selected time interval for purposes of calculating the conditional probability values, and may, for example, be a value such as 1, 10 or infinity. Rather than defining the selected time period in terms of days, the time period may, for example, be defined in terms of hours, minutes. Although not depicted in FIG. 3, the process may exclude from consideration (a) purchases made outside a browsing session in which the browsed item was viewed, and/or (b) purchases that followed an intervening purchase, as mentioned above.

In step 72, the count value generated for each browsed item/purchased item pair is divided by the total number of users that purchased any item within 0-N days after viewing the browsed item. The result of this calculation is the corresponding conditional probability value. Thus, for example, assuming that one thousand users made a purchase 0-N days after viewing item A, and that one hundred of those users purchased item B 0-N days after viewing item A, the conditional probability value 50 for the pair item A/item B would be 100/1000, or 10%, in the embodiment depicted in FIG. 3. As mentioned above, purchases of items falling outside the top-level category of the browsed item may optionally be disregarded for purposes of this calculation.

In step 74, item pairs that are not included within a similar items table 64 (FIG. 1) are optionally filtered out of the results set. The effect of this step is to inhibit or prevent the conditional probability listings 60 from including items that are not closely related to the item featured on the detail page. In a preferred embodiment, the similar items table 64 is generated using the process depicted in FIG. 3B of the '763 publication. Specifically, the similar items table 64 identifies pairs of items that have co-occurred relatively frequently within the session-specific browsing histories of users (e.g., items A and B are related because a relatively large number of the users who viewed item A also viewed item B during the same browsing session). One attribute of this relatedness metric is that the items identified as being related are typically substitutes for each other. Any of a variety of alternative item similarity metrics may be used. In addition, rather than using a similar items table 64, the filtering in step 74 may be performed by retaining only those pairs for which both items fall within the same bottom-level or other item category.

In step 76, the remaining set of "purchased items" for a given "browsed item" are sorted from highest to lowest conditional probability value, and the top M "purchased items" are retained for inclusion within the mapping table 46. Thus, M item pairs are effectively retained, each of which is composed of the browsed item and one of the retained purchased items. M may be a selected integer such as five or ten. Thus, for example, although many different items may have been purchased by users who viewed item A, only those M items that were purchased relatively frequently by users who viewed item A are included within the table entry for item A. In step 0078, the remaining (retained) item pairs and corresponding conditional probability values are stored in the mapping table 46 (FIG. 1). Because the process is fully automated, table entries may be generated, and conditional probability lists 60 may be displayed, for many hundreds of thousands or millions of different catalog items.

Figure 4:
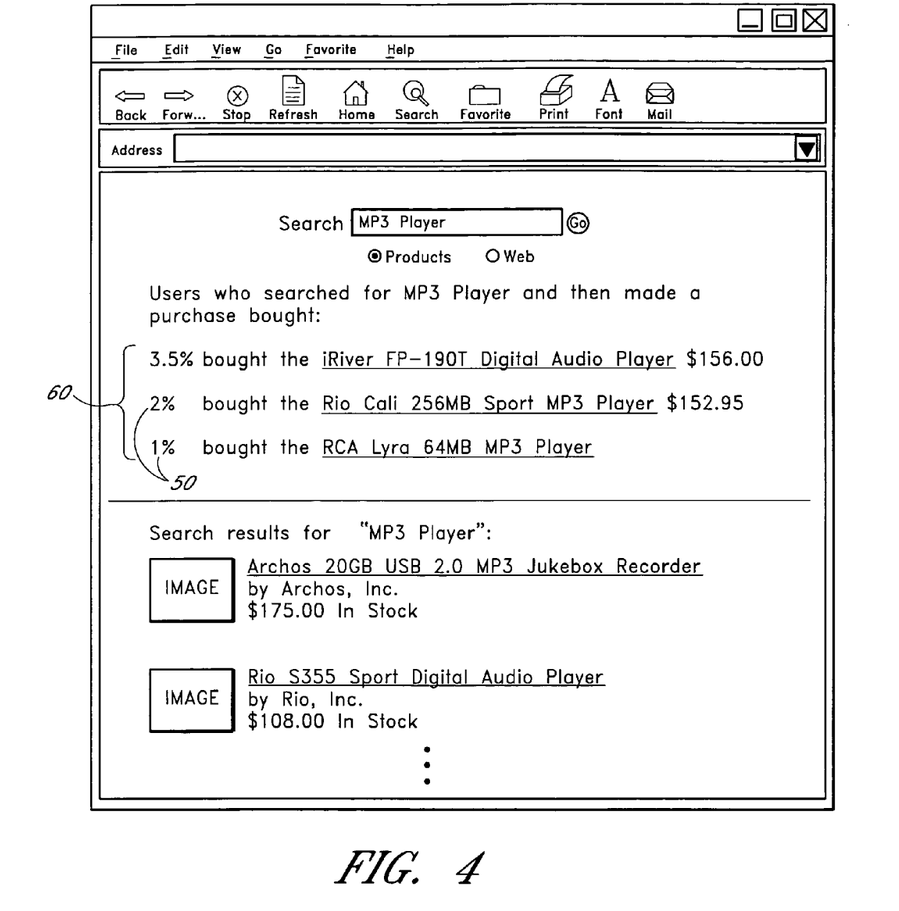
FIG. 4 illustrates an example search results page in accordance with one embodiment of the invention.

The above-described processes may also be used to provide conditional probability data to users who conduct keyword searches. For example, as depicted in FIG. 4, when a user runs a search for "mp3 player," the search results page may be supplemented with a conditional probability list 60 indicating the frequencies with which users that have purchased a product after searching for "mp3 player" have purchased specific products. To implement this variation, the table generation process 44 may be modified to perform the following steps:

analyze user activity data reflective of user search activities to identify the most frequently submitted search queries (e.g., the 100,000 most common search queries);

for each such search query, identify a set of users that submitted the search query and then made a purchase, and     for each such set of users, calculate, for each of a plurality of items purchased by one or more users in the set after submitting the respective search query, what percentage of the set of users purchased the respective purchased item.

Some or all of the resulting percentages (conditional probability values) may be stored in a mapping table that maps search queries to corresponding lists 60 of purchased items. When a user submits a search query, the list 60 of purchased items associated with that search query, including the associated percentage values 50, may be retrieved from the mapping table and incorporated into the search results page returned to the user. Conditional probability lists 60 may be omitted from search results pages where none of the conditional probability values associated with the query exceeds a particular threshold, such as 1%.

In another embodiment of the invention, the user activity data is analyzed to generate conditional probability data for specific sets of two or more viewed items. This data may be presented to users that view all of the items in the set during the current browsing session. For example, once a user has selected item A and item B for viewing, the user may be notified that "users who made a purchase after viewing item A and item B bought the following: 5% bought item B, 2% bought item C, and 1% bought item A." To implement this feature, the browse histories of users may be analyzed to identify specific sets of N items that are frequently viewed during the same browsing session, where N may be two, three or four, for example. Once such a set of N items is identified, the users who viewed all N items and then made a purchase are identified. The percentages of these users that bought specific items are then calculated and stored in a look-up table in association with the set of items. As a user browses the catalog, the user's session record (set of viewed items) may be compared to this look-up table to determine whether a match exists.

In yet another embodiment, conditional probability data is generated that reflects the frequencies with which users who purchase a first item also purchase each of a plurality of second items. This data may be displayed on item detail pages in the same manner as described above. For example, the detail page for a particular item may be augmented to display a message of the following form: "users who purchased this item also purchased the following: X % bought item A, Y % bought item B . . . ." The conditional probability data may optionally be calculated so as to take into consideration the order in which the items were purchased. For instance, to generate data to display on the detail page for item A, the conditional probability calculations may be based solely on purchases made after a purchase of item A. The messaging on item A's detail page may then read generally as follows: "User's who made a purchase after buying this item bought the following . . . ."

As mentioned above, the invention is not limited to purchase events, but rather applies to a variety of different types of item acquisition actions. For example, for purposes of the generating conditional probability data, an item may be treated as having been "acquired" by a user if the user has placed an order to rent or purchase the item or, in the case of downloadable items, has initiated a download of the item. In some embodiments, the act of adding an item to an electronic shopping cart or wish list may also be treated as an acquisition of the item.

The invention may also be applied more generally to a wide range of other types of browsing actions and events. Thus, in general, whenever a user performs a particular set of one or more conditioning actions (page views, item views, item purchases, browse node accesses, search query submissions, etc.), the user may be provided with conditional probability data reflective of the frequencies with which users who have performed this set of conditioning events have also (or have therafter) performed specific predictive events. Each such predictive action may, but need not, correspond to a particular item in an electronic catalog, such that the user is provided with guidance for selecting items from the catalog. Thus, the invention includes a data mining method that comprises programmatically analyzing user activity data to calculate a frequency with which users who have performed a defined predictive action after performing a defined set of one or more conditioning actions have performed the predictive action in association with a first item; when a user performs the set of one or more conditioning actions, the user is notified of said frequency to assist the user in evaluating the first item as a candidate.

As will be apparent, the features and attributes of the specific embodiments disclosed above may be combined in different ways to form additional embodiments, all of which fall within the scope of the present disclosure.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims, which are intended to be construed without reference to the incorporated-by-reference materials.

What is claimed is:

1. A data mining method, comprising:
programmatically analyzing user activity data that reflects item viewing events and item acquisition events to calculate, for a pair of items item_A, item_B, a frequency with which users that have acquired an item after viewing item_A have acquired item_B; and
when a user selects item_A for viewing in an electronic catalog of items, notifying the user of said frequency with which users that have acquired an item after viewing item_A have acquired item_B, to assist the user in selecting an item to acquire;
wherein the method is performed automatically by a system that comprises computer hardware.

2. The data mining method of claim 1, wherein a decision to notify the user of said frequency is responsive to a programmatic determination that item_A and item_B are likely substitutes by virtue of a relatively high frequency with which users who viewed item_A during a browsing session also viewed item_B during the browsing session.

3. The data mining method of claim 1, wherein the frequency is calculated without taking into consideration at least one of the following: (a) items acquired outside an item category in which item_A falls, (b) acquisition events that occurred more than a selected time period after viewing item_A, (c) acquisition events that occurred within browsing sessions in which item A was not viewed.

4. The data mining method of claim 1, further comprising calculating, and notifying the user of, a frequency with which users that have acquired an item after viewing item_A have acquired item_A, to assist the user in selecting between at least item_A and item_B.

5. The data mining method of claim 4, wherein the user is notified of said frequencies via messaging included on an item detail page for item_A.

6. The data mining method of claim 1, wherein, for purposes of calculating the frequency, a user who viewed item_A and acquired item_B within a selected time interval is treated as having acquired item_B after viewing item_A.

7. The data mining method of claim 1, wherein the user is notified of the frequency by notifying the user of a percentage of users that acquired item_B.

8. A computer system, comprising:
- a monitoring component that monitors user actions performed with respect to acquirable items in an electronic catalog to generate user activity data reflective of actions of a plurality of users;
- a data mining component that analyzes the user activity data to determine, for a selected pair of items item_A, item_B in the electronic catalog, what percentage of a set of users who viewed item_A and acquired an item acquired item_B; and
- a server that is responsive to selection of item_A by a user for viewing in the electronic catalog by notifying the user of said percentage of users that acquired item_B, said server comprising computer hardware.

9. The computer system of claim 8, wherein the data mining component determines the percentage without taking into consideration at least one of the following: (a) acquisitions of items falling outside an item category of item_A, (b) item acquisition events that occurred more than a selected time period after corresponding viewing events of item_A, (c) item acquisition events that occurred within browsing sessions in which item_A was not viewed.

10. The computer system of claim 8, wherein the data mining component determines the percentage without taking into consideration item acquisition events that occurred prior to corresponding viewing events of item_A.

11. The computer system of claim 8, wherein the data mining component additionally calculates, and the server notifies the user of, a percentage of the set of users that acquired item_A.

12. The computer system of claim 8, wherein the server notifies the user of said percentage by serving an item detail page for item_A with a representation of said percentage included in said item detail page.

13. The data mining method of claim 1, wherein the item acquisition events are item purchase events.

14. The computer system of claim 8, wherein the data mining component calculates said percentage based on purchases made by users who have viewed item A.

\* \* \* \* \*